(12) United States Patent
Mundt et al.

(10) Patent No.: US 8,499,176 B2
(45) Date of Patent: Jul. 30, 2013

(54) INFORMATION HANDLING SYSTEM LOW POWER IMAGE CUSTOMIZATION

(75) Inventors: Kevin Mundt, Austin, TX (US); Ayedin Nikazm, Austin, TX (US)

(73) Assignee: Dell Products L.P., Round Rock, TX (US)

(*) Notice: Subject to any disclaimer, the term of this patent is extended or adjusted under 35 U.S.C. 154(b) by 278 days.

(21) Appl. No.: 13/019,107

(22) Filed: Feb. 1, 2011

(65) Prior Publication Data

US 2012/0198245 A1    Aug. 2, 2012

(51) Int. Cl.
*G06F 1/00* (2006.01)
(52) U.S. Cl.
USPC .......................................................... 713/300
(58) Field of Classification Search
USPC .......................................................... 713/300
See application file for complete search history.

(56) References Cited

U.S. PATENT DOCUMENTS

| | | | |
|---|---|---|---|
| 7,509,444 B2 * | 3/2009 | Chiu et al. ..................... 710/51 |
| 7,779,032 B1 | 8/2010 | Garfinkel | |
| 8,046,606 B2 * | 10/2011 | Lu ................................. 713/300 |
| 8,108,698 B2 * | 1/2012 | Bennett ......................... 713/300 |
| 2003/0027589 A1 * | 2/2003 | Wennemer et al. ............ 455/550 |
| 2006/0075144 A1 * | 4/2006 | Challener et al. ............. 709/250 |
| 2006/0224794 A1 | 10/2006 | Stevens | |
| 2007/0033426 A1 * | 2/2007 | Wilson et al. ................. 713/324 |
| 2007/0268111 A1 * | 11/2007 | Chng et al. .................... 340/5.74 |
| 2008/0250077 A1 | 10/2008 | Fahey et al. | |
| 2009/0042411 A1 * | 2/2009 | Chou et al. ...................... 439/65 |
| 2009/0147758 A1 * | 6/2009 | Kumar ........................... 370/338 |

* cited by examiner

*Primary Examiner* — Paul R Myers
*Assistant Examiner* — Christopher A Daley
(74) *Attorney, Agent, or Firm* — Terrile, Cannatti, Chambers & Holland, LLP; Robert W. Holland

(57) ABSTRACT

Directly powering an information handling system non-volatile storage device through an external connector allows imaging of the non-volatile storage device through the external connector with the information handling system in a powered down state. Imaging in a powered down state by providing power and image data to the non-volatile storage device directly through an external connection allows imaging while the information handling system is packaged, such as at intermediate shipping locations.

20 Claims, 4 Drawing Sheets

INFORMATION HANDLING SYSTEM LOW POWER IMAGE CUSTOMIZATION

BACKGROUND OF THE INVENTION

1. Field of the Invention

The present invention relates in general to the field of information handling system manufacture, and more particularly to an information handling system low power image customization.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems come in a wide variety of forms that are adaptable to a wide variety of functions. For example, desktop information handling systems provide robust solutions with good processing capabilities at fixed locations, such as in an office space, while portable information handling systems provide convenience and adequate processing capabilities for accomplishing mobile tasks, such as word processing, e-mail and web browsing. Specific systems are built with a wide range of components to adapt to desired processing and footprint design goals. Generally, each information handling system includes a non-volatile memory device that provides long term storage of information needed for operation of the information handling system, such as an operating system and applications. For example, a hard disk drive (HDD) or solid state drive (SSD) is typically included in each information handling system with an operating system and applications that are installed during manufacture. Often, the operating system and applications are installed as an "image" during manufacture by copying to the manufactured information handling system's non-volatile memory a copy of the operating system and applications as they would exist on an operational information handling system, thus bypassing the installation process. For instance, Ghost or other imaging systems copy the image to the newly manufactured information handling system at a "burn rack" after assembly of hardware components.

Large enterprises that use large numbers of information handling systems often develop custom images for installation on information handling systems manufactured for the enterprises. Custom images are often installed at the location of the physical manufacture of the information handling systems. As an alternative, custom images are installed at a regional location that is closer to the location of the delivery of the information handling systems. With a regional installation, information handling systems that are assembled and packaged at distant locations are shipped to a regional location, unpackaged, powered up, imaged, repackaged and then shipped to their destination. Imaging at distant, centralized manufacturing locations tends to increase shipping time for information handling systems as compared with shipping of un-imaged systems, however, unpackaging and repackaging information handling systems for regional imaging adds to the expense of the systems due to the greater amount of handling required. As one example, the added handling of unpackaging and repackaging information handling systems for regional imaging added expense to each system versus performing imaging at the manufacture location. Although regional imaging adds expense to each system, it also allows the use of an inventory of commonly-ordered hardware configurations to be rapidly delivered from regional locations instead of from manufacture locations, which are often overseas.

SUMMARY OF THE INVENTION

Therefore a need has arisen for a system and method which supports low power image installation to a packaged information handling system.

In accordance with the present invention, a system and method are provided which substantially reduce the disadvantages and problems associated with previous methods and systems for imaging an information handling system non-volatile storage device. An external connector at the housing of an information handling system provides access to power and image a non-volatile storage device within the information handling system with the information handling system in a powered down state. Powering the hard disk drive from the external connector supports imaging with the information handling system otherwise unusable, such as in packaging at an intermediate delivery destination.

More specifically, an information handling system is assembled and packaged at a manufacture location and then shipped to an intermediate location. At the intermediate location, an external connector accessible through the packaging accepts data and power for communication directly to a hard disk drive so that the hard disk drive can be imaged with the information handling system powered down except for the power applied through the external connector, such as an eSATA or USB connector that is selectively switched between a controller and the hard disk drive. For example, multiplexors interfaced between data and power traces of the connector and the hard disk drive selectively switch trace connections to allow imaging when desired.

The present invention provides a number of important technical advantages. One example of an important technical advantage is that manufactured information handling systems are imaged in a low power state, such as with external power applied only to the components needed to copy an image to a hard disk drive. Since the information handling system is imaged in a low power state, imaging can be performed with the information handling system remaining packaged for delivery. Powering a hard disk drive or solid state drive through an external special purpose bus minimizes generation of heat and eliminates the need for cooling fan operation so that packaging will not interfere with the imaging process. Thus, imaging is performed at regional locations rather than a centralized manufacture location without a need for unpackaging information handling systems. Alternatively, imaging may be performed at a manufacture location with the information handling system in a low power consumption or off state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Directly powering a non-volatile storage device with a connector external to an information handling system housing allows imaging of the non-volatile storage device with the information handling system powered down and even packaged. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
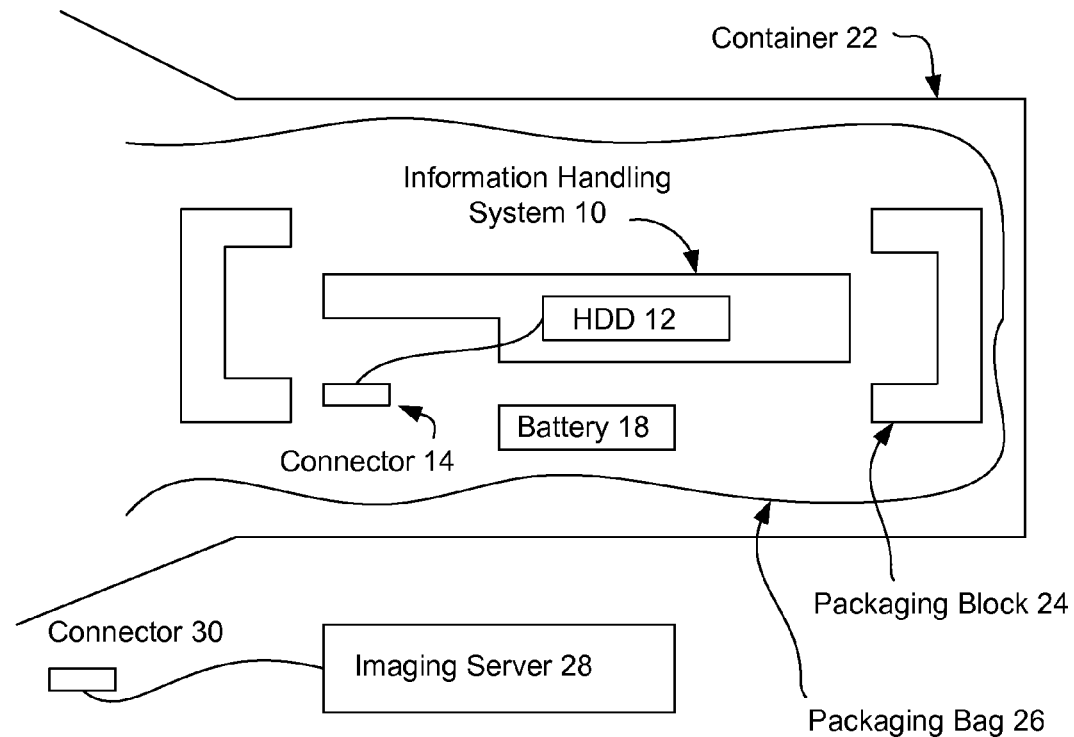
FIG. 1 depicts a packaged information handling system imaged by powering a non-volatile storage device with an external connector.

Referring now to FIG. 1, a packaged information handling system 10 is imaged by powering a non-volatile storage device 12 with an external connector 14. Information handling system 10 has plural processing components disposed in a housing 16 that cooperate to process information. For example, a CPU and RAM disposed in housing 16 execute applications stored on non-volatile storage device 12 to generate information for presentation as images at a display. Non-volatile storage device 12 is, for example, a hard disk drive or solid state drive that stores information after power is removed. In the example embodiment of FIG. 1, information handling system 10 includes a battery 18, depicted as uninstalled, which provides an internal power source to power the processing components when installed at battery opening 20. Information handling system 10 is packaged in a container 22, such as a cardboard box, with other packaging devices, such as Styrofoam packaging blocks 24 and an electrostatic packaging bag 26.

External connector 14 provides information handling system 10 with flexibility to have an image transferred to non-volatile storage device 12 when packaged and powered down. For example, information handling system 10 is packaged in container 22 with blocks 24 and bag 26 at a manufacturing location and then shipped to an intermediate destination, such as a regional inventory hub that stores manufactured information handling systems. Once at the intermediate destination, external connector 14 is accessed through the packaging used to ship information handling system 10, such as by opening container 22 and bag 26 but leaving information handling system 10 in place so that the system remains ready to ship by closing container 22 and bag 26. External connector 14 is then interfaced with an imaging server 28 by coupling an imaging connector 30 to external connector 14. External connector 14 receives power from imaging connector 30, which powers up non-volatile storage device 12 so that an image is copied from imaging server 28 through external connector 14 to non-volatile storage device 12. Once the image is copied, external connector 14 is decoupled from imaging connector 30 and information handling system 10 is ready to ship to a final destination for the end user associated with the image.

Providing power directly to non-volatile storage device 12 at external connector 14 allows the remaining components of information handling system 10 to remain powered down during imaging, thus preventing over heating in container 22 or operation of a cooling fan in bag 26. In the example embodiment, external connector 14 has a one-time use of imaging non-volatile storage device 12 during manufacture and is therefore placed in the battery opening where it will not interfere with subsequent use of information handling system 10. In alternative embodiments, existing ports, such as USB or eSATA ports, or information handling system 10 may be used to perform the imaging. In one alternative embodiment, a toggle wire is included with external connector 14 to make access easier within packaging and then removed after imaging is complete to avoid interfering with subsequent system use. In order to avoid end user confusion about the presence of a one-time use imaging port, the port may be sealed after imaging is complete.

Figure 2:
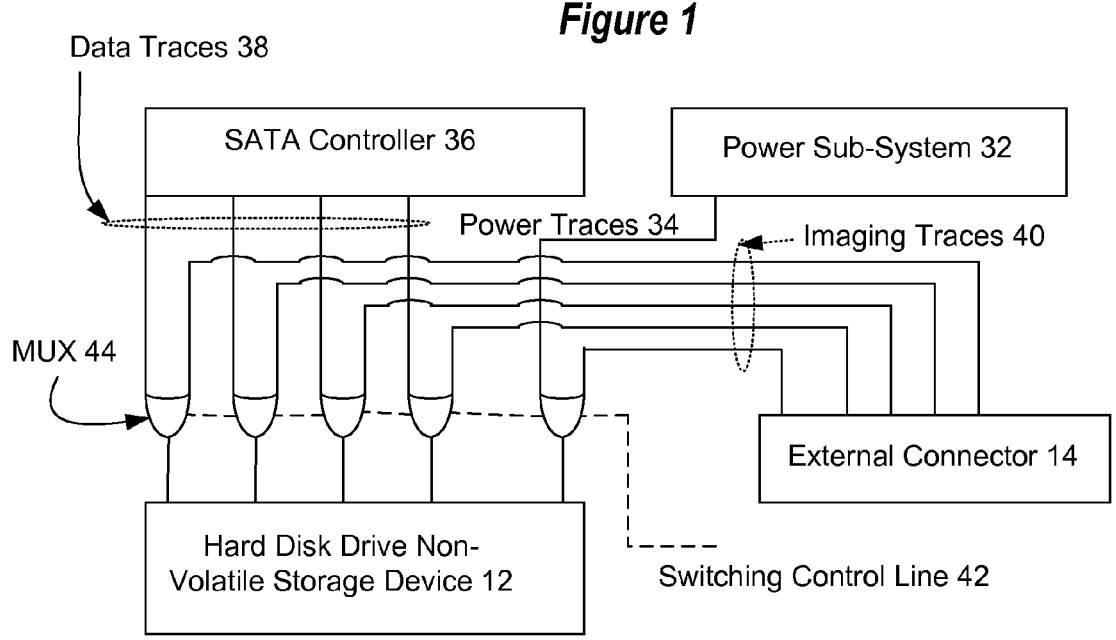
FIG. 2 depicts a circuit diagram of one example embodiment of an external connector that images a non-volatile storage device.

Referring now to FIG. 2, a circuit diagram depicts one example embodiment of an external connector 14 that images a non-volatile storage device 12. External connector 14 is accessible at the outer housing of an information handling system, such as in a location that is accessible while the information handling system is packaged. During normal operations, a power subsystem 32 provides power to a hard disk drive non-volatile memory device 12 through power traces 34, and a SATA controller 36 manages data communications through data traces 38. Imaging traces 40 communicate between external connector 14 and the power traces 34 and data traces 36. When external connector 14 is not connected, no signals are provided by imaging traces 40 and the operation of power traces 34 and data traces 38 are not impacted. When a connector is coupled to external connector 14 and applies power, a signal is sent through a control line 42 to activate multiplexors 44 so that power and data signals provided through imaging traces 40 are sent to hard disk drive 12. In an alternative embodiment, the default path in the absence of power may be to interface the external connector so that when power is connected, the multiplexors interface internal power and data traces. In order to prevent back feed of power to system components, an FET may be included with the multiplexer 44 that switches power from power traces 34 to imaging traces 40. In one embodiment, multiplexors 44 are disabled when power is applied by power traces 34 so that external connector 14 will not interfere with normal hard disk drive operations when an information handling system is powered up. When power and data are provided by external connector 14, an image can be transferred through external connector 14 to hard disk drive without power applied to other information handling system components. Once external connector is disconnected from external signals, multiplexors 44 return power traces 34 and data traces 38 to their normal operations.

Figure 3:
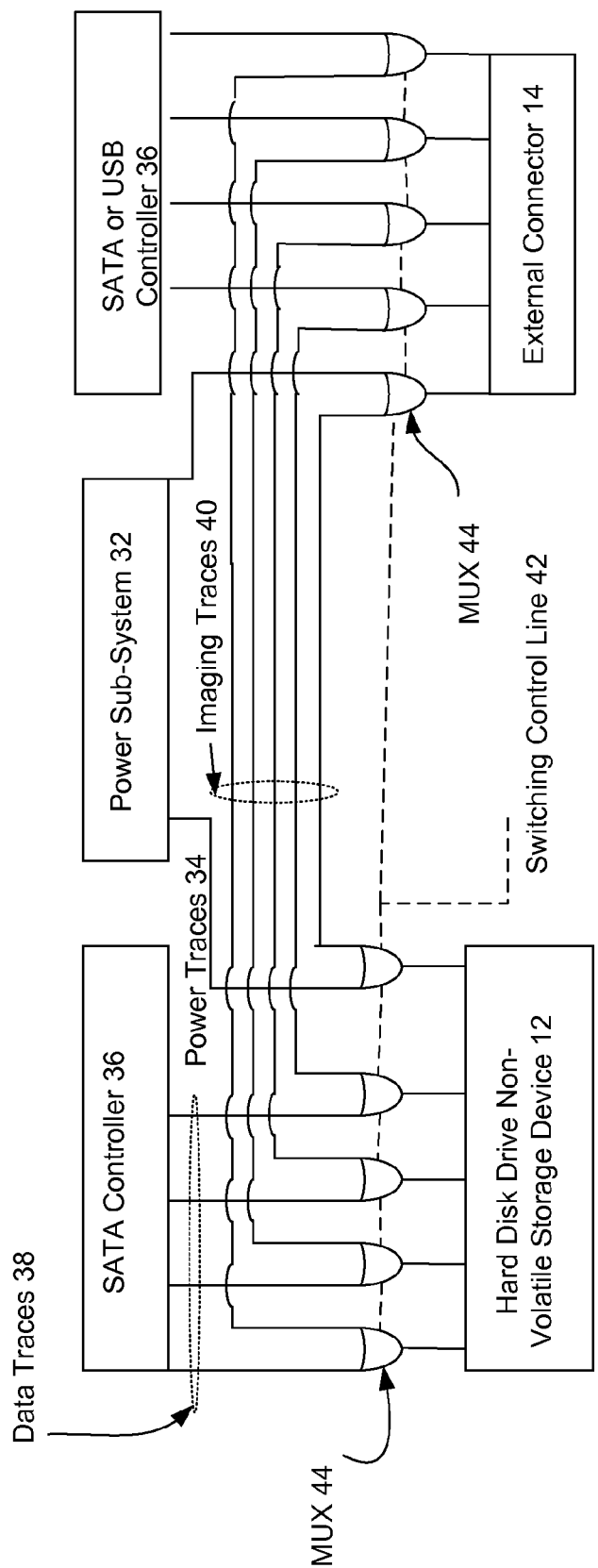
FIG. 3 depicts a circuit diagram of another example of an external connector that images a non-volatile storage device.

Referring now to FIG. 3, a circuit diagram depicts another example of an external connector 14 that images a non-volatile storage device 12. In the alternative embodiment depicted by FIG. 3, an existing connector of the information handling system provides a dual use for imaging a non-volatile storage hard disk drive device 12 with the information handling system in a powered down state. For example, an existing USB or eSATA port is retasked with the information handling system powered down to support imaging of a hard disk drive 12. In order to retask an existing port, two sets of multiplexors 44 are interfaced with the data and power traces. The first set of multiplexors 44 isolate the SATA or USB controller 36 associated with the port 14 from the port while the second set of multiplexors 44 direct traces from port 14 to hard disk drive 12. Both a USB and an eSATA port 14 work with differential pairs and can handle power and data transfers to operate and image hard disk drive 12. In one embodiment, back feeding of a control signal to a pin on port 14 externally triggers multiplexors 44 to switch traces so that power and data are routed from port 14 to hard disk drive 12. During normal system operations, the back feed trigger is disable by an embedded controller of the information handling system. When the information handling system is powered down, an imaging operator connects a cable to port 14 and, as power is applied through the cable, multiplexors 44 transfer trace connections of port 14 from the default path to the SATA traces of hard disk drive 12 to support imaging with hard disk drive 12 powered from port 14. With an eSATA port, the connection occurs with a conventional eSATA pin definition so that powered down imaging can be supported with a conventional eSATA cable. In one embodiment, the embedded controller and/or BIOS includes a lockout mode for multiplexors 44 to prevent easy access to hard disk drive 12 to alleviate security concerns.

Figure 4:
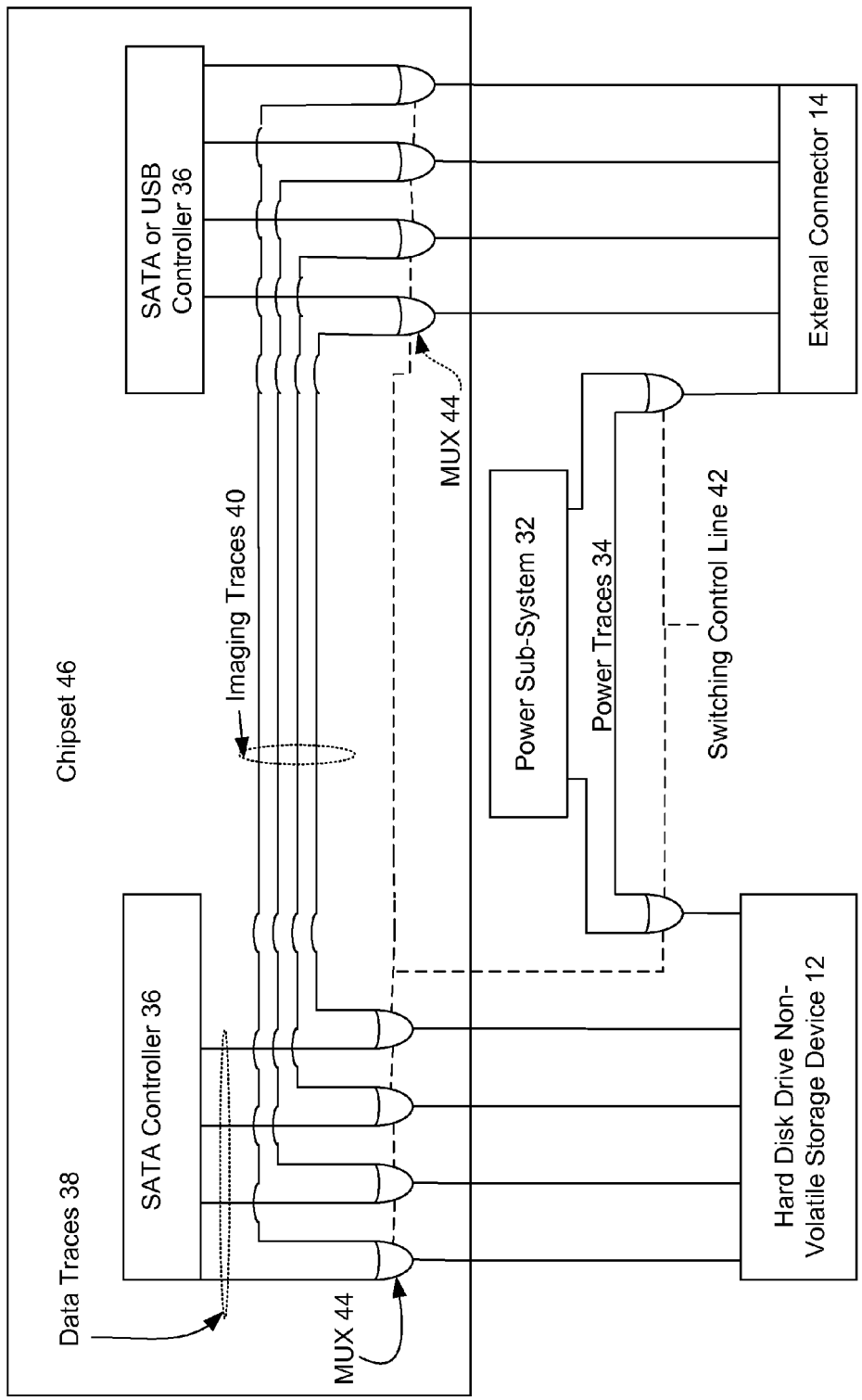
FIG. 4 depicts a circuit diagram of another example of an external connector that images a non-volatile storage device through a system chipset.
Figure 5:
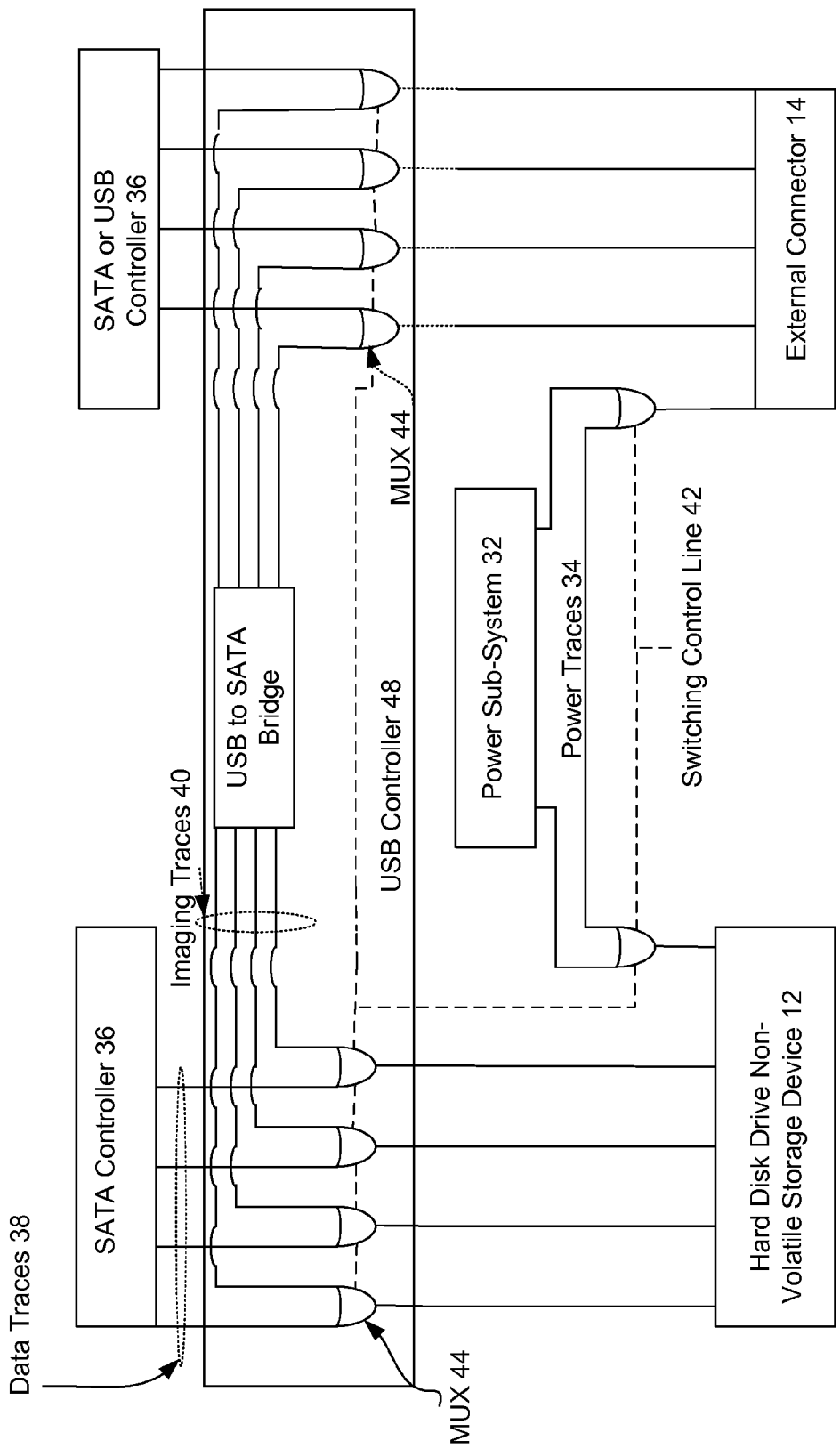
FIG. 5 depicts a circuit diagram of another example of an external connector that images a non-volatile storage device through a USB controller.

Referring now to FIGS. 4 and 5, circuit diagrams depict another example of an external connector that images a non-volatile storage device through a system chipset 46 and USB controller 48 respectively. SATA and USB controllers are often included internal to system chipsets 46 so that switching functions for managing external connector 14 to hard disk drive 12 interfaces are included in chipset 46. For example, chipset 46 isolates primary data paths to an internal SATA controller and reroutes SATA HD pins to the eSATA pins. Some portion of chipset 46 will have some power applied in order to accomplish the switching. Rather than powering the chipset, logic to switch connector traces to storage devices traces may be included in a discrete device, such as the USB controller 48 as depicted by FIG. 5. With system power off and power applied through a USB connector 14, logic in USB controller 48 automatically provides power and data from USB connector 14 to hard disk drive 12 to allow imaging of hard disk drive 12. By including logic for imaging in USB controller 48, TPM type encryption may be provided to limit access to authorized users. In addition to imaging at manufacture, the dual-purpose USB port may be used by information technology professionals to image the hard disk drive on delivery of the system to an enterprise purchaser.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having a battery opening sized to accept a battery;
   plural components disposed in the housing and operable to cooperate to process information, wherein at least one of the plural components is a non-volatile storage device;
   a connector disposed in the battery opening and accessible from external to the housing only when the battery is not present, the connector interfaced with the non-volatile storage device and operable to communicate information to the non-volatile storage device;
   imaging logic interfaced with the connector and non-volatile storage device, the imaging logic operable to selectively power the non-volatile storage device from the connector and to copy information provided at the connector to the non-volatile storage device; wherein an embedded controller disposed in the housing disables the applying of power through the external connector to the non-volatile storage device when the information handling system is in a powered up state.

2. The information handling system of claim 1 wherein the non-volatile storage device comprises a hard disk drive.

3. The information handling system of claim 1 wherein the non-volatile storage device comprises a solid state drive.

4. The information handling system of claim 1 wherein the imaging logic selectively powers the non-volatile storage device with the other plural components powered off.

5. The information handling system of claim 1 wherein the connector comprises a SATA connector.

6. The information handling system of claim 1 wherein the connector comprises a USB connector.

7. The information handling system of claim 1 wherein the imaging logic comprises a multiplexor to selectively switch internal power and data lines interfaced with the non-volatile storage device to interface with the connector.

8. The information handling system of claim 1 further comprising a battery disposed in the housing and operable to provide power to the components, wherein the connector is disposed between the battery and the housing.

9. The information handling system of claim 1 wherein the information copied to the non-volatile storage device comprises an image having an operating system and plural applications.

10. A method for manufacture of an information handling system, the method comprising:
    assembling components into a housing at a manufacture location, the components operable to process information and including a non-volatile storage device and a connector interfaced with the non-volatile storage device, the connector accessible external to the housing;
    packaging the housing at the manufacture location into a container for shipment;
    shipping the housing from the manufacture location to an intermediate location in the container;
    copying an image through the connector to the non-volatile storage device at the intermediate location by powering the non-volatile storage device through the connector while the housing remains packaged in the container; and shipping the housing to a destination location in the container.

11. The method of claim 10 further comprising:

packaging the housing in a container at the manufacture location; and copying the image with the housing in the container.

12. The method of claim 10 wherein copying further comprises providing power to the housing only at the connector during copying of the image.

13. The method of claim 10 wherein copying further comprises keeping the components other than the non-volatile storage device in a powered down state during copying the image.

14. The method of claim 10 wherein the non-volatile storage device comprises a hard disk drive.

15. The method of claim 10 wherein the non-volatile storage device comprises a solid state drive.

16. A method for copying an image to a non-volatile storage device assembled in an information handling system, the method comprising:

placing the information handling system in a powered down state;

coupling an external connector with the non-volatile storage device through a housing connector disposed in a housing of the information handling system;

applying power through the external connector to the non-volatile storage device through the housing connector; and copying the image to the non-volatile storage device through the external connector with the power provided through the external connector;

wherein an embedded controller disposed in the housing disables the applying of power through the external connector to the non-volatile storage device when the information handling system is in a powered up state.

17. The method of claim 16 wherein copying the image further comprises multiplexing power and data lines from the external connector to data and power lines disposed in the information handling system and interfaced with the non-volatile storage device when the external connector is coupled to the information handling system.

18. The method of claim 17 wherein the external connector comprises a USB connector.

19. The method of claim 17 wherein the external connector comprises an eSATA connector.

20. The method of claim 16 wherein coupling an external connector further comprises leaving the information handling system in packaging while coupling the external connector at a housing of the information handling system.

* * * * *